UNITED STATES PATENT OFFICE.

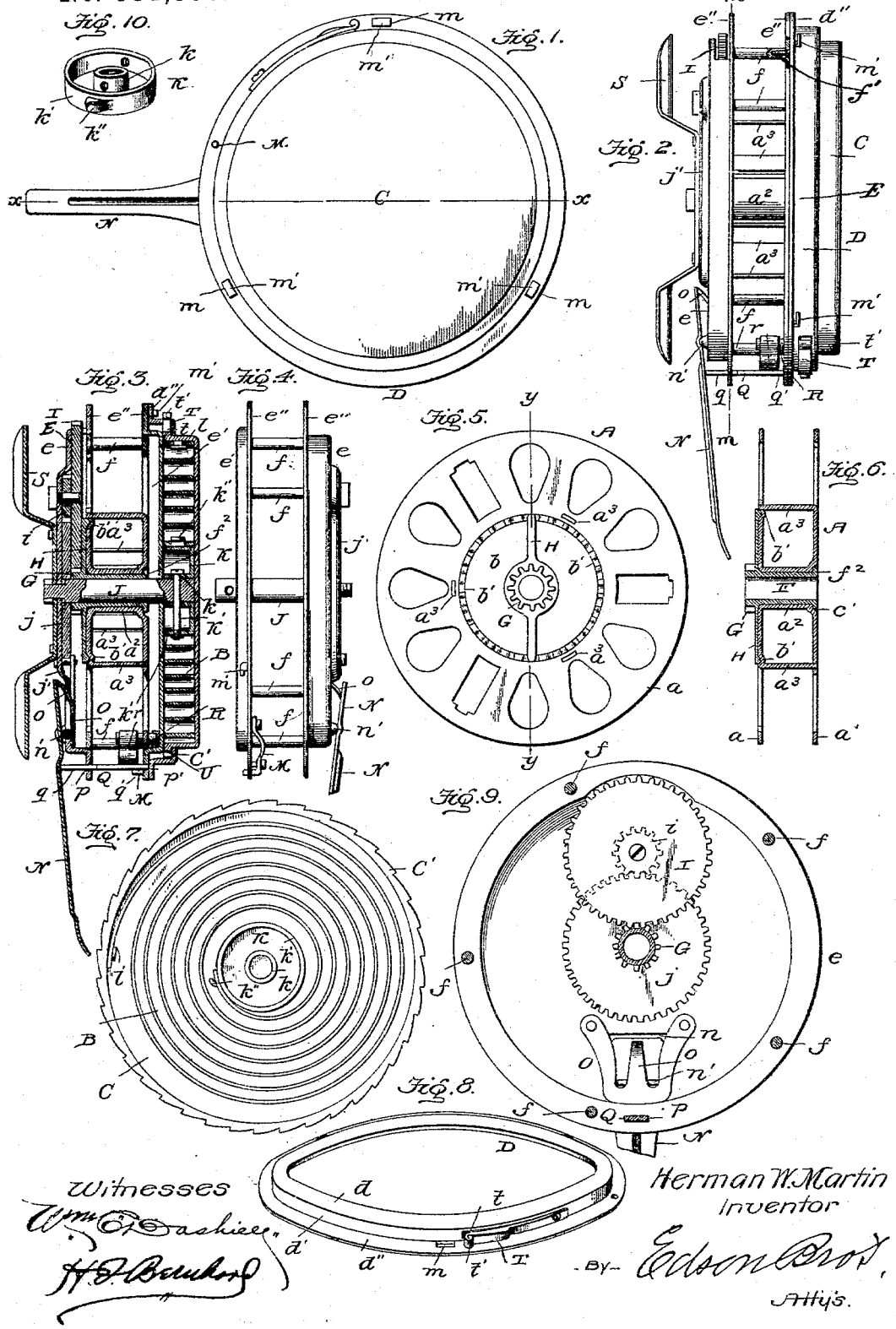

HERMAN W. MARTIN, OF ILION, NEW YORK, ASSIGNOR TO FRANCIS I. MARTIN, OF SAME PLACE.

FISHING-REEL.

SPECIFICATION forming part of Letters Patent No. 551,550, dated December 17, 1895.

Application filed May 21, 1895. Serial No. 550,135. (No model.)

*To all whom it may concern:*

Be it known that I, HERMAN W. MARTIN, a citizen of the United States, residing at Ilion, in the county of Herkimer and State of New York, have invented certain new and useful Improvements in Fishing-Reels; and I do hereby declare the following to be a full, clear, and exact description of the invention, such as will enable others skilled in the art to which it appertains to make and use the same.

This improvement in fishing-reels relates more especially to that class in which a spring is employed to automatically wind the line and keep the latter in a taut condition; and the special objects that I have in view in the present invention are, first, to provide a friction-clutch ratchet for one of the train of gears, which are so associated with the line-spool arbor, that operates to permit rotation of the reel and unwinding of the line therefrom without affecting the spring when it is wound up; secondly, to provide an improved main-spring drum which can be detached and changed without removing the line or reel from the pole, and which drum is connected with the reel-casing in a manner to dispense with fastening-screws, which screws are objectionable in that they are liable to work loose and become lost; thirdly, to provide a main-spring ratchet-detent, which can be easily released to insure unwinding of the main spring without rotating the line-spool; fourthly, to so combine a brake with the main-spring drum that the main spring cannot be strained beyond its capacity, and, finally, to construct the several parts in a simple and durable manner with a view to their assemblage in a compact form.

With these and such other ends in view as pertain to my invention it consists in the novel combination of devices and in the construction and arrangement of parts, which will be hereinafter fully described and claimed.

To enable others to understand my invention, I have illustrated one embodiment thereof in the accompanying drawings, forming a part of this specification, and in which—

Figure 1 is an elevation looking at the outer face or side of the reel. Fig. 2 is an edge elevation. Fig. 3 is a transverse sectional view taken on the plane indicated by the dotted line $x$ $x$ of Fig. 1. Fig. 4 is a perspective view, partly in section, of the reel casing or housing. Fig. 5 is an elevation of the line-spool, looking at that side or head thereof which fits in the member or plate of the reel-casing that is attached to the pole, showing the friction-clutch for line-pinion, and Fig. 6 is a detail sectional view on the plane indicated by the dotted line $y$ $y$ of Fig. 5. Fig. 7 is a detail view of the main-spring drum. Fig. 8 is a detail view of the annular clamping-ring that confines the rotatable main-spring drum on the reel casing or housing. Fig. 9 is a sectional view on the plane indicated by the dotted line $m$ $m$ of Fig. 2, and Fig. 10 is a detail view of the boss by which the inner end of the main spring is connected to the line-spool arbor.

Like letters of reference denote corresponding parts in all the figures of the drawings, referring to which—

A denotes the line-spool. B is the main spring. C is the rotatable drum which incloses the main spring, and D is the annular clamp that confines the rotatable drum on the reel casing or housing E.

The reel-housing consists of two disks or plates $e$ $e'$, which are spaced a suitable distance from one another to accommodate between them the line-spool A. Said plates are preferably stamped or struck up from sheet metal in disk form and provided with annular flanges $e''$ $e''$, and to the annular flange $e''$ of the disk or plate $e$ is fitted a series of pillars or posts $f$, the other ends of which are fitted against the flange $e''$ of the other plate or disk $e'$, said flanged disk $e'$ being provided with openings through which are passed screws $f'$ that enter threaded sockets produced in the ends of the pillars or posts $f$, whereby the two disks or plates $e$ $e'$ are rigidly connected together and held in their proper parallel, concentric positions.

The line-spool A is made up of the disks $a$ $a'$, the tubular or sleeve-like hub $a^2$, and the tongues $a^3$. Each disk is struck up in a single piece from a sheet of metal. During the operation of striking up the disks, holes are punched in disk by removing part of the metal, and the metal from certain of the holes (three or more in each disk) remains integral with the disk to form the tongues $a^3$, which tongues from each side are bent at right angles to the plane of the disk and have their free ends united to the other disk, said tongues $a^3$ of the two disks forming the spool on which the line is coiled. During the operation of striking up the disk $a$, an annular or circular depression $b$ is formed centrally therein, and a series of notches or seats $b'$ are produced within this depression, which notches or seats $b'$ are equidistant from the center of the disk and are arranged in annular series. A depression $c'$ is formed in the other disk $a'$ during the process of stamping up the same from sheet metal; but this depression $c'$ in disk $a'$ is of less diameter than the notched depression $b$ in the disk $a$.

To the opposing faces of the two disks $a\,a'$ is secured the sleeve-like hub $a^2$, and in this hub is fitted the bushing F, one end of which carries the line-spool pinion G and the other end of which bushing is provided with an annular rim $f^2$ that is fitted in the depression $c'$ of disk $a'$, which rim $f^2$ prevents endwise play of the bushing F in one direction within the hub $a^2$ of the line-spool A.

The bushing F and pinion G are rigidly united to insure simultaneous movement of the parts, and this bushing is fitted loosely in the hub of the line-spool. The bushing and pinion G are normally made fast to the line-spool by a friction-clutch H, which is rigid with the bushing F or the pinion G, and which clutch engages with the notches or seats $b'$ with a yielding or spring tension sufficient to hold the bushing and pinion in engagement with the disk $a$ of the line-spool but which engagement between the friction-clutch and the notched spool-disk $a$ is not sufficient to hold the pinion and bushing in event of a considerable pull on the line-spool, whereby the line-spool can be rotated in one direction by a pull on the line without rotating the pinion G, the train of gears, presently described, nor the spring-arbor.

The friction-clutch shown as the preferred embodiment of the invention consists of a strip of elastic metal H, which is secured at its middle to the bushing F or pinion G, and which has its ends formed with little tongues that are adapted to take into two of the series of notches or seats $b'$ in the spool-disk $a$.

The pinion G, carried by the clutch-controlled bushing in the line-spool, is arranged to mesh with the gear I, the arbor of which is fitted to the disk $e$ of the reel-housing, and on this gear I is made fast a pinion $i$, which in turn meshes with a primary gear $j$ on the arbor J, one end of which is loosely journaled in the center of the disk or plate $e$ of the reel-housing.

It will be noted that the friction-clutch H is housed or contained within the depression $b$ of the line-spool disk $a$, and that the train of gears G I $i\,j$ is housed within the dish-shaped plate or disk $e$ of the reel-casing, whereby all the gears are concealed and protected from view between the reel-casing and the line-spool.

The arbor J extends loosely through the pinion G, the bushing F, and a central boss $j'$ on the disk $e$ of the reel-casing, the free end of said spindle being projected through the disk $e'$ of the reel-casing E for the attachment of the main spring B thereto.

The main spring B is of the helical variety to enable it to be applied edgewise to the disk $e'$ of the reel-casing, and this spring B and its inclosing drum C are compactly disposed against the outside (or disk $e$) of the reel-casing E. The connection between the inner end of the helical spring B and the free end of the arbor J is effected by means of the boss K. This boss is struck up from a piece of sheet metal with a flange $k$ surrounding a central opening therein and a circumferential flange $k'$, the latter having a tongue $k''$ extending beyond the periphery of the boss. The boss is slipped over the end of the arbor, so that its inner flange $k$ fits closely to the arbor, and the boss is made fast to the arbor by means of a screw $K'$, which passes through holes or notches in the flanges $k\,k'$, and is screwed into a threaded hole formed near the end of the arbor J. A hole is formed in the inner end of the spring B, into which hole is slipped or fitted the tongue $k''$ on the boss K, the inner coil of the spring hugging closely to the boss K and being connected securely thereto by the tongue $k''$.

The drum C is preferably struck up from a piece of metal with an annular right-angled flange $l$, the outer surface of which is milled or roughened to enable it to be conveniently grasped by hand for the purpose of rotating the drum and putting the spring B under tension. This drum C has a ratchet-surface $C'$ produced on or attached to the inner edge of the flange $l$, and this inner edge of the flange and face of the ratchet $C'$ are fitted to bear or ride against the disk or plate $e'$ of the reel-casing E. The drum C is provided with a right-angled stud $l'$ on the interior of its flange $l$, the projecting end of which stud is fitted in a slot or aperture in the outer end of the spring B, and the spring and drum are thus connected in a manner to put the spring under tension when the drum is rotated by hand in one direction, which connection also permits of the ready separation of the drum from the spring when it is desired to remove the drum from the reel for any purpose whatever. This drum C is held or confined on the reel-casing E to house or inclose the spring and permit the drum to be rotated by means of the annular clamp D. This clamp is made up of the flange $d$, the rim $d'$, and the flange $d''$, the flange $d$ at the outer edge of the rim being a little larger than the diameter of the flange $l$ of the drum, and the flange $d''$ at the inner edge of the rim being fitted against the flange $e''$ of the disk $e'$ forming a part of the reel-casing E, said flanges $d''\,e''$ being flush with each other, as shown. This clamp D loosely embraces the flange l and ratchet C' of the drum C, so as to hold the drum in place and permit it to be supported and rotated within the clamp D, and said clamp D is rigidly fastened to the disk e' of the reel-casing in a manner to permit the clamp to be detached from the reel and without the employment of screws, the latter being objectionable because they are liable to work loose and get lost. A series of slots m are cut in the flange d'' of the clamp D, a series of right-angled studs m' are fastened to the outer side or face of the flange e'' of the disk e' on the reel-casing, and a spring-pawl M is fastened to the disk e' in a manner to permit its prong to pass through apertures in the disk e' and the clamp D. In applying the clamp D it is fitted around the drum C to embrace the ratchet thereof and so that the slots m will receive the headed studs m' on the disk e'. The clamp is turned slightly to bring the studs m' to the ends of the slots, and the prong of the pawl slips into the aperture in the clamp, thus holding it against rotation and preventing disengagement of the headed studs from said clamp.

I employ a brake to control the rotations of the line-spool when the spring is put under tension and which also serves the purpose of a stop to prevent the spring from being unduly strained. A slot or hole n is cut in the disk e of the reel-casing, and a lever N is fulcrumed at n' on this disk e in a manner so its short arm lies over the slot, while its long arm extends a suitable distance from the reel for convenient operation by hand. To the inside of the disk e is secured a plate O which is stamped from sheet metal with a spring-tongue o, the latter being fitted in or extended through the slot n to bear against the short arm of the lever N. In the flange e'' of the disk e is cut a slot p, and in the corresponding flange of the other disk e' are punched the holes p' p'. A brake-shoe Q is stamped from a sheet of metal with a tongue q and the prongs q' q', and said shoe has a socket r in which is secured a suitable frictional material—such, for example, as leather or like material. The brake-shoe is arranged across the space between the disks e e' of the reel-casing, and the tongue q is fitted in the slot p of the disk e, while the prongs q' are fitted in the apertures p' of the disk e', said shoe being arranged so its tongue is normally in contact with the long arm of the brake-lever, while its friction plug or surface R is presented to ride against the face of one of the disks of the line-spool. This brake-shoe is carried by the disks e e' of the reel-casing, in which disks the shoe is slidably mounted, and the shoe is normally pressed by the spring-controlled lever N against the line-spool with sufficient force to restrain the line-spool from rotating when the spring is wound to its highest tension, whereby the brake acts to arrest the line-spool and prevent straining the main spring, and the spool cannot be impelled or rotated by the spring until the brake is released, while at the same time the line-spool can be rotated in the other direction by a pull on the line, because its friction-clutch is adapted to slip over the ratchet formed by the seats b' in the depression b and thereby permit the line to be uncoiled without affecting the tension of the main spring, either when the spring is wound up or when free from tension.

S is the attaching-plate, which is fastened to the disk e of the reel-casing and which has its ends bent to be fitted in the fishing-pole, to which it is clamped by any of the usual appliances.

From the foregoing description, taken in connection with the drawings, it will be noted that the spring-drum can be easily detached from the reel-casing without removing the reel from the pole. This is effected by releasing the pawl M from the clamp D, turning the clamp to withdraw the lugs m' from the slots therein, and then removing the clamp and drum from the casing E, the spring being readily separated from the drum C and boss K.

The spring is held from unwinding by means of the spring-detent T, which is fastened to the rim d' of the clamp, and which has a prong t and a thumb-piece t'. The prong t of the spring-detent is passed through an aperture t'' in the rim d' of the clamp, so that it will engage with the ratchet C' of the spring-drum. The thumb-piece t' provides a convenient means for releasing the detent from the ratchet C' and allowing the drum C to rotate freely when it is desired to uncoil the spring, and when the spring-drum uncoils it will be noted that the line-spool is not rotated, because it is held by the friction-brake.

I am aware that changes in the form and proportion of parts and in the details of construction of the devices herein shown and described as the preferred embodiment of my invention can be made without departing from the spirit or sacrificing the advantages of my invention, and I therefore reserve the right to make such modifications and alterations as fairly fall within the scope of my invention.

I also employ a stationary brake-shoe U, which is carried by the plate e' of the reel-casing. This brake-shoe consists of a socket-piece which is fixed to the plate e' at a point opposite to, or in line with, the shoe of the movable brake, and in this socket-piece is secured a piece of leather or other material that bears against the revoluble line-spool, whereby the line-spool is adapted to be gripped or held between the shoe of the movable brake and the fixed shoe U, as will be understood.

Having thus fully described my invention, what I claim as new, and desire to secure by Letters Patent, is—

1. The combination with a reel casing, an arbor, and a line spool, of a main spring, and an inclosing drum detachably confined on the reel casing and connected with said spring, substantially as described.

2. The combination with a casing, an arbor, and a line spool, of a main spring connected to said arbor, a rotatable drum which incloses the main spring and is connected thereto, and means for clamping said drum detachably to the casing while permitting rotation of the drum, substantially as and for the purposes described.

3. The combination with a casing, a line spool, and an arbor, of a main spring, a rotatable drum therefor, and an annular clamp which confines the drum detachably on the casing, substantially as described, for the purposes set forth.

4. The combination with a casing, a line spool, and an arbor, of a main spring, a rotatable drum connected to said spring, and an annular clamp detachably fastened to the casing and fitted to the drum to hold it in place while permitting free rotation of the drum within said clamp, substantially as and for the purposes described.

5. The combination with a reel casing, a line spool, and an arbor, of a main spring, a rotatable drum connected to the spring and provided on its periphery with a ratchet, an annular clamp fastened to the casing and embracing the rotatable drum, and a detent carried by said clamp to engage with the ratchet of said drum, substantially as and for the purposes described.

6. The combination with a reel casing, and a drum, of the slotted clamp, headed studs fixed to the reel casing and fitted in the slotted clamp, and a stop engaging with the reel casing and the clamp to prevent the latter from turning on the reel casing, substantially as and for the purposes described.

7. The combination with an arbor, and a line spool, of a boss fitted to the arbor and secured thereon by a suitable retainer, a main spring having its inner end fitted to, and connected to a projection on, the boss, and a drum connected to the main spring, substantially as and for the purposes described.

8. The combination with a reel casing, an arbor, and a train of gears, of a line spool, and a ratchet clutch which engages with the line spool and which carries one of the train of gears, substantially as and for the purposes described.

9. The combination with an arbor, and a main spring, of a line spool having a ratchet, a clutch which engages with said ratchet and which carries the line-spool pinion, and gearing between the line-spool pinion and the arbor, the friction clutch being arranged to permit rotation of the line spool in one direction without affecting the main spring, substantially as described.

10. The line spool having one of its disks formed with a series of notches or seats, combined with a friction clutch which engages with the notches or seats, a line spool pinion carried by said clutch, an arbor, gearing between the line-spool pinion and the arbor, and a main spring, substantially as described.

11. The line spool provided with a depression and with notches or seats within the same, a bushing carrying a line-spool pinion, and a friction clutch within the depression to engage with the notches or seats and said clutch being rigid with the bushing or pinion, combined with a main spring arbor, and gearing between the line spool pinion and the arbor, substantially as described.

12. The combination with a reel casing, and a line spool, of a brake slidably fitted to the casing and provided with a friction shoe which is presented to the line spool, and a spring-controlled lever acting against the slidable brake, substantially as and for the purposes described.

13. The combination with a reel casing, and a line spool, of a brake slidably fitted in the reel casing, a friction shoe carried by the brake to bear upon the line spool, a lever against which bears the slidable brake, and a fixed plate having a spring tongue that presses the lever normally against the brake, substantially as and for the purposes described.

14. The combination with a reel casing and a line spool, of a stationary brake shoe carried by the reel casing and arranged to bear against the line spool, and a movable brake also carried by the casing and having a shoe to press against said line spool, substantially as described.

In testimony whereof I affix my signature in presence of two witnesses.

HERMAN W. MARTIN.

Witnesses:
B. B. VAN DEUSEN,
E. B. MAURICE.